United States Patent
Porsch et al.

(10) Patent No.: US 9,055,035 B2
(45) Date of Patent: Jun. 9, 2015

(54) MEDICAL DEVICE WITH SECURE DATA TRANSMISSION

(75) Inventors: Ulrich Porsch, Weinheim (DE); Kai-Oliver Schwenker, Hassloch (DE); Daniel Birtwhistle, Fishers, IN (US); Raymond Strickland, Indianapolis, IN (US); Max Moser, Winterthur (CH); Thorsten Schroeder, Berlin (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 505 days.

(21) Appl. No.: 13/434,298

(22) Filed: Mar. 29, 2012

(65) Prior Publication Data

US 2012/0269347 A1    Oct. 25, 2012

(30) Foreign Application Priority Data

Apr. 5, 2011    (EP) .................................... 11161175

(51) Int. Cl.
*H04L 9/00*    (2006.01)
*H04L 29/06*   (2006.01)
*H04W 72/02*   (2009.01)
*H04W 76/02*   (2009.01)

(52) U.S. Cl.
CPC .......... *H04L 63/0428* (2013.01); *H04L 63/061* (2013.01); *H04L 63/18* (2013.01); *H04L 2463/061* (2013.01); *H04W 72/02* (2013.01); *H04W 76/02* (2013.01)

(58) Field of Classification Search
CPC ... H04L 63/061; H04L 63/18; H04L 63/0428; H04L 2463/061; H04W 72/02; H04W 76/02
USPC .......................................................... 380/277
See application file for complete search history.

(56) References Cited

U.S. PATENT DOCUMENTS 7,885,411 B2 *   2/2011   Little et al. .................... 380/277
2002/0045920 A1 *   4/2002   Thompson ...................... 607/60

FOREIGN PATENT DOCUMENTS

EP    1513288 A2    3/2005
WO    02/056536 A1    7/2002
WO    2006/097783 A1    9/2006

* cited by examiner

*Primary Examiner* — William Goodchild
(74) *Attorney, Agent, or Firm* — Roche Diabetes Care, Inc.

(57) ABSTRACT

Secure transmission of electronic data via a data communication link is provided between a device and an additional device with independent transmission channels, wherein at least one of the devices is a medical device. Secure transmission comprises the following steps or means: providing a password in the device, receiving the password in the a additional device separate from the data communication link, selecting one of the independent transmission channels, encrypting the channel identification of the selected independent transmission channel using the received password in the additional device, transmitting the encrypted channel identification from the additional device to the device via the data communication link and decrypting the encrypted channel identification in the device, providing a session key in the device and the additional device and transmitting encrypted electronic data between the device and the additional device via the independent transmission channel.

10 Claims, 1 Drawing Sheet

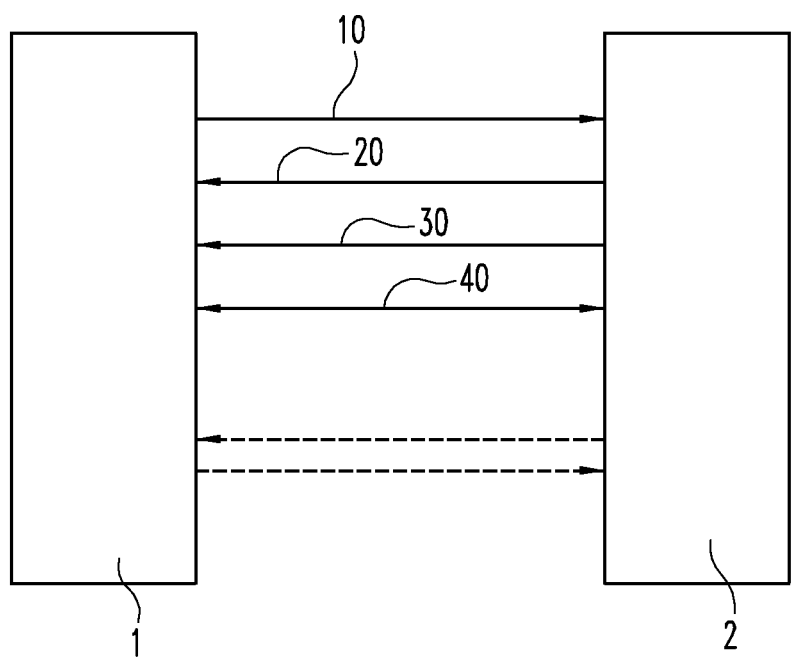

MEDICAL DEVICE WITH SECURE DATA TRANSMISSION

REFERENCE

This application claims priority to European Patent Application No. EP 11 161 175.2 filed Apr. 5, 2011, which is hereby incorporated by reference.

FIELD

This disclosure relates to a method for the secure transmission of electronic data via a data communication link between a device and an additional device, wherein at least one of the devices is a medical device.

BACKGROUND

The statements in this section merely provide background information related to the present disclosure and do not constitute prior art.

A problem associated with medical devices of any kind is that of transmitting sensitive electronic data adequately securely between the medical devices themselves or between a medical device and a non-medical device. The non-medical device may be an evaluation device, for example. A computer system may be used for this, for example, whereby data transmitted to the device can be evaluated for subsequent output via a display device or printer, for example. A personal computer, for example, can be used for this.

Cryptographic methods, for example, may be used for secure transmission between devices of this kind. They are used to encrypt the electronic data being transmitted. The algorithms used for encryption and decryption can be identical. The encryption method is referred to as symmetrical if identical secret keys are constantly used for encryption and decryption. Cryptographic methods with different keys for encryption and decryption are referred to as asymmetric. These include, for example, the method whereby the transmitter of electronic data uses a public key of the recipient for encryption and the recipient uses its secret, non-public, so-called private key for decryption.

SUMMARY

According to an aspect of the present disclosure, a method and means for the secure transmission of electronic data via a data communication link is provided, which is formed between a device and an additional device with independent transmission channels, wherein at least one of the devices is a medical device and wherein the method comprises the following steps: providing a password in the device, receiving the password in the additional device separate from the data communication link, selecting one of the independent transmission channels by means of a channel selection function in the additional device, wherein a channel identification is assigned to the selected transmission channel, encrypting the channel identification of the selected independent transmission channel using the received password in the additional device, transmitting the encrypted channel identification from the additional device to the device via the data communication link and decrypting the encrypted channel identification in the device, providing a session key in the device and the additional device and transmitting encrypted electronic data between the device and the additional device via the independent transmission channel selected using the session key for the encryption and decryption of the electronic data.

The method provides an improved process for the secure transmission of electronic data via a data communication link between a device and an additional device, wherein at least one of the devices is a medical device. In particular, the handling process for the key(s) used in the process of establishing and using the data transmission is optimized.

The proposed method therefore initially involves the provision of a password in one of the communicating devices, which can be the medical device. The password in the sense used here is characterized such that it may be used for cryptographic processes, in other words for the decryption and encryption of electronic data. The password provided is then received by the additional device. The transmission of the password to the additional device takes place separately and is triggered by the data communication link, which is implemented, for example, in that a user input is recorded on the additional device, which is likewise a medical or alternatively a non-medical device, for example in that a user input is recorded via a keyboard. It may also be provided that a separately formed communication link different from the data communication link is used between the devices for transmission of the password. This communication link may only be temporarily created, for example, for transmission of the password.

In the additional device, one of the independent transmission channels which are available in the context of the data communication link for the transmission of electronic data between the device and the additional device, is then selected by means of a channel selection function, which can be achieved by means of a device function which uses a random algorithm. The selected independent transmission channel is assigned a channel identification, such as a channel number and/or a channel letter, for example, which is then encrypted cryptographically using the password. Encrypted channel identification information is produced in this way. This is then transmitted to the device by the additional device via the data communication link and decrypted in the device, wherein the previously supplied password is used for this. It may be provided here that the device is now set up for data communication via the independent transmission channel identified using the channel identification, for example by initiating a reception mode ("listen" operating mode) for the transmission channel identified using the channel identification.

In the device, as well as in the additional device, one or more session keys are therefore provided, which are used for the subsequent encryption and decryption of electronic data being transmitted, so that electronic data are transmitted between the device and the additional device via the data communication link, in other words via the transmission channel identified by means of the channel identification. Provision of the one or more session keys in the devices involved in communication may occur in a variety of ways, which are explained in greater detail below. Key generation mechanisms and methods are known as such, moreover, in a number of different ways.

With the help of the proposed method, security in the design and use of one or more transmission channels between the participating devices is improved. Initially, information concerning a (randomly) selected transmission channel is transmitted using encryption/decryption by means of the password. A particularly high level of security exists if the password in one embodiment is generated in the device and notified to the user via an output device, such as a display, whereupon the user for his part is able to enter the password in the additional device via an input mechanism. Particularly with this possible embodiment of the method, provision of the password, which is used to transmit information concerning the channel identification, takes place independently and is triggered by the data communication link between the device and the additional device, which is finally used for transmission of the electronic data being transmitted. In this case, the additional device records a user input of the password, so that this is then provided in the additional device.

Alternatively or additionally, provision may also be made in another embodiment for the password to be transmitted from the device to the additional device via a communication link, which is formed separately from the data communication link with the several independent transmission channels. In this case too, information relating to the password is transmitted between the device and the additional device independently and separately from the data communication link finally used to transmit the encrypted electronic data.

When the encrypted channel identification is transmitted from the additional device to the device, another independent transmission channel of the data communication link is used, which is different from the selected independent transmission channel. The encrypted information relating to the channel identification of the independent transmission channel selected therefore takes place via another independent transmission channel of the data communication link, which is different from the selected independent transmission channel used later for the encrypted transmission of data, at least initially. Here, too, provision may be made for the other independent transmission channel to be selected at random, in which case a selection would be disregarded if it would result in the previously selected independent transmission channel being determined. It may be determined in this case that the selection of the other independent transmission channel to be used here to transmit the encrypted channel identification should be repeated or simply a transmission channel deviating from this one stipulated.

In one embodiment, it may be provided that a generation key is initially provided when supplying the session key and the session key is generated by means of a generation function using the generation key. A generation key of this kind is also referred to as the derivation key. The generation key is used by a so-called key derivation function, in order to generate one or more secure keys, namely the session key(s), starting from a master key or other known information such as a password. In this case, a so-called pseudo-random function is used for cryptography. One or more session keys are therefore derived from the generation key, in that the generation or derivation function is executed. The generation key itself is produced at random in the additional device or the device, for example in the form of a 128-bit binary code. It may then be transmitted to the other device involved in the communication via the data communication link, preferably via the independent transmission channel identified by means of the channel identification.

When supplying the generation key, the generation key is supplied in the device and the additional device and the session key is derived independently in the device and the additional device in each case. In this embodiment, the generation key is used in both devices, in other words, in both the device and also the additional device, in order to generate the one or several session keys in the two devices independently of one another.

The generation key and/or the session key exhibits a greater key length than the password. This enables a method to be implemented in which a key of shorter length, namely the password, is generated and supplied. This shorter length key is then used to transmit information over a (randomly) selected independent transmission channel between the devices. A longer-length key, namely the generation key, is then used to derive the session key or keys for the encryption/decryption of the transmitted electronic data. The key length is a feature of cryptographic methods and commonly denotes a logarithmic measure for the number of different possible keys in the method. In conjunction with digital encryption methods, the key length may be differentiated, particularly using a bit number.

The password may be supplied in the device, such that the password is generated in the device by means of a password generation function. The password is supplied in the device, which is preferably the medical device, constantly with the help of the password generation function for example, if the device user launches a software application, which provides a transmission of electronic data between the device and the additional device. In this way, the user is advised of a password that can be used for encryption and decryption independently of the data communication link, which is used later for the actual transmission of the encrypted data, and said password is also supplied in the device itself. Alternatively, it may be provided that the password is generated and supplied independently of the device and the additional device, so that in the method for the exchange of electronic data the password can be recorded both in the device and also in the additional device, for example by means of the automatic recording of a user input.

The password may be issued by an output mechanism of the device. In this embodiment, the password supplied in the device is notified to the user via an output mechanism, for example a display and/or a printer. The user is thereby enabled to use the password on the additional device.

A practical embodiment may provide that the data communication link is in the form of as a wireless data communication link. The wireless data communication link may be WLAN (Wireless Local Area Network), ZigBee (radio), NFC (Near Field Communication) or Bluetooth, for example.

The selected independent transmission channel ends after a usage time and another of the independent transmission channels between the device and the additional device is selected, which is then used subsequently for the further encrypted transmission of electronic data. In this case, use of the transmission channel identified by means of the channel identification ends after the usage time and a new transmission channel is selected from the number of available transmission channels between the participating devices, which is then used subsequently for the further encrypted transmission of electronic data. The usage time may be determined depending on application or negotiated between the devices. For the one-way transmission or two-way exchange of electronic information concerning the channel change process, for the transmission of information, for example, which identifies the newly selected transmission channel, the transmission channel currently in use is preferably used, after which use of said channel is terminated. However, information used to negotiate conditions of use for the new transmission channel, relating for example to a usage period and/or transmission characteristics, can also be exchanged via the existing channel. For use of the new channel, the generation of one or more additional session keys may be provided. The remarks concerning the session keys apply accordingly in this case. This kind of method may also be referred to as channel hopping, as several independent transmission channels are used to optimize the security of data transmission in the context of the transmission of electronic data.

One embodiment envisages that the other of the independent transmission channels based on the encrypted electronic data transmitted via the chosen transmission channel is selected.

BRIEF DESCRIPTION OF THE DRAWING

FIG. 1 shows a schematic of secure transmission of electronic data between a medical device and another device.

DETAILED DESCRIPTION

The following description is merely exemplary in nature and is not intended to limit the present disclosure, application, or uses. It should be understood that throughout the drawings, corresponding reference numerals indicate like or corresponding parts and features.

The only figure shows a schematic representation to describe a method for the secure transmission of electronic data between a medical device 1 and an additional device 2, which is set up for data communication with the medical device 1 and which is a non-medical device, such as a personal computer, or an additional medical device.

The transmission of electronic data between the medical device 1 and the additional device 2 takes place via a data communication link, which in turn comprises several independent transmission channels and is preferably in the form of a wireless connection. A connection of this kind may be created within the framework of a WLAN, for example, or by means of Bluetooth. A ZigBee (radio) or NFC connection can also be used.

The transmitted electronic data relate to security-relevant medical data, such as the results of blood sugar analyses, which are carried out using the medical device 1, if this is a blood sugar measuring unit. However, the data transmission method may also be used for other medical devices of any kind, if a high degree of security is required for data transmission. The transmission of patient-specific medical data, in particular, is made possible in a secure manner with the help of the proposed method.

For the secure transmission of electronic data between the medical device 1 and the additional device 2, the following method is implemented in exemplary embodiments. Initially, a password that can be used for cryptographic methods for digital encryption and decryption is supplied in one embodiment in the medical device 1. This occurs, for example, in that when a software application is launched in the medical device 1, a password generation function is executed, with which a password is randomly generated. The password is then issued via an output mechanism in the medical device 1, such as a display or printer, for example. The user of the medical device 1 is then in a position to enter the password on the additional device 2, which is schematically depicted as step 10 in the Figure. The additional device 2 therefore automatically records a user input of the password. An independent transmission channel is then selected with the help of a selection function in the additional device 2 from the number of independent transmission channels in the data communication link between the medical device 1 and the additional device 2. The several independent transmission channels are created independently and separately from one another in the context of the data communication link, preferably as an element of a wireless data communication link.

Channel identification is assigned to the chosen independent channel, such as a channel number and/or a channel letter. The channel identification is then encrypted in the additional device 2 using the recorded password by means of cryptography. The encrypted channel identification information is then transmitted from the additional device 2 to the medical device 1 via the data communications link, as is shown schematically in the Figure by means of step 20. In the medical device 1, the encrypted information is decrypted, so that information on the channel identification is present in the additional device 2 too. The additional device 2 is then set up for data communication via the selected transmission channel, in that a reception mode for receiving electronic data is launched via the selected independent transmission channel, for example.

At the next stage, a so-called generation key for cryptography is generated and supplied in the additional device 2 with the help of a corresponding functionality. This involves a 128-bit long binary code, for example. However, generation keys with a different key length can also be provided. The generation key is then transmitted via the data communication link, preferably via the previously selected independent transmission channel, from the additional device 2 to the medical device 1 (cf. stage 30 in the Figure), so that the generation key is available both in the medical device 1 and also in the additional device 2.

Using the generation key, a session key is then generated in the medical device 1 and the additional device 2 independently of one another with the help of a generation or derivation function. The session key is then used for a transmission of encrypted data between the medical device 1 and the additional device 2, which is shown schematically in the Figure by means of a step 40. The electronic data transmitted in this case are therefore encrypted and decrypted with the help of one or several session keys.

Using the method described, the possibility is created for a password to be supplied in the medical device 1 and in the medical device 2, initially independently of the data communication link which is finally used for the transmission of encrypted electronic data, said password preferably exhibiting a short key length. Once an independent transmission channel has been selected and established for the subsequent transmission of electronic data, the generation key can be provided, which preferably has a longer key length than the password. Overall, the method enables the security of the transmission of electronic data to be improved using cryptographic methods.

Thus, embodiments of the medical device with secure transmission of data are disclosed. One skilled in the art will appreciate that the teachings can be practiced with embodiments other than those disclosed. The disclosed embodiments are presented for purposes of illustration and not limitation, and the invention is only limited by the claims that follow.

What is claimed is:

1. A method for medical device secure transmission of electronic data over a wireless communications link having multiple transmission channels, comprising:
   providing a password in a medical device;
   receiving the password in an additional device separate from manual entry by a user;
   selecting a transmission channel of the wireless communications link using a channel selection function in the additional device, wherein a channel identification is assigned to the selected transmission channel;
   encrypting the channel identification of the selected transmission channel using the password received in the additional device;
   transmitting the channel identification that was encrypted from the additional device to the medical device via the wireless communication link and decrypting the channel identification that was encrypted in the medical device;
   transmitting a session key from the additional device to the medical device over the selected transmission channel; and transmitting electronic data that was encrypted between the medical device and the additional device via the selected transmission channel using the session key for the encryption and decryption of the electronic data.

2. The method of claim 1,
wherein during transmission of the channel identification that was encrypted from the additional device to the medical device, another transmission channel of the data communication link is used, which is different from the selected transmission channel.

3. The method according to claim 1,
wherein when supplying the session key, a generation key is first supplied and the session key is generated by a generation function using the generation key.

4. The method of claim 3,
wherein when supplying the generation key, the generation key is supplied in the medical device and an additional device and the session key is derived independently in the medical device and the additional device in each case.

5. The method according to claim 1,
wherein a generation key has a longer key length than the password.

6. The method according to claim 1,
wherein the password is supplied in the medical device, such that the password is generated in the medical device by a password generation function.

7. The method according to claim 1,
wherein the password is issued via an output mechanism of the medical device.

8. The method according to claim 1,
wherein use of the selected transmission channel that was selected ends after a usage time and another selected transmission channel is selected between the medical device and the additional device, which is then used subsequently for the further encrypted transmission of electronic data.

9. The method according to claim 8,
wherein the another selected transmission channels is selected based on the encrypted electronic data transmitted via the selected transmission channel.

10. A method for medical device secure transmission of electronic data over a wireless communication link having multiple transmission channels, comprising:
means for providing a password in a medical device;
means for receiving the password in an additional device separate from manual entry by a user;
means for selecting a transmission channel of the wireless communication link using a channel selection function in the additional device, wherein a channel identification is assigned to the selected transmission channel;
means for encrypting the channel identification of the selected transmission channel using the password received in the additional device;
means for transmitting the channel identification that was encrypted from the additional device to the medical device via the wireless communication link and decrypting the channel identification that was encrypted in the medical device;
means for transmitting a session key from the additional device to the medical device over the selected transmission channel; and
means for transmitting electronic data that was encrypted between the medical device and the additional device via the selected transmission channel selected using the session key for the encryption and decryption of the electronic data.

* * * * *